United States Patent Office 3,306,951
Patented Feb. 28, 1967

3,306,951
ISOMERIZATION OF OLEFINIC HYDROCARBONS
Seymour J. Lapporte, Berkeley, Calif., assignor to Chevron Research Company, a corporation of Delaware
No Drawing. Filed Aug. 5, 1963, Ser. No. 300,103
6 Claims. (Cl. 260—683.2)

This invention relates to the preparation of novel olefinic isomerization catalysts and to their use in the isomerization of olefinic hydrocarbons. More particularly, this invention relates to the isomerization of olefinic hydrocarbons by catalyzed carbon-carbon double bond rearrangement through the use of anhydrous iron salts promoted by activating amounts of an organometallic compound.

In accordance with the present invention, olefinic hydrocarbons having more than three carbon atoms per molecule are isomerized under mild reaction conditions, without appreciable accompanying side reactions, such as polymerization, aromatization, condensation, and the like. In particular, hydrocarbons having multiple olefinic functional groups are rapidly and efficiently isomerized to conjugated polyolefinic compounds, in which form these polyolefins lend themselves more readily to useful addition and polymerization reactions, such as the Diels-Alder and diene rubber polymer formation reactions.

It has now been found that olefins can be isomerized by carbon-carbon double bond shifting by contacting an isomerizable olefinic hydrocarbon at a temperature in the range from about 0–300° C. for a period of from about 0.001 to 50 hours with the interaction product of one formula weight of an anhydrous reducible iron salt and from about 0.5 to 6 mols of an iron salt reducing organometallic compound. Catalytic amounts of isomerizing catalyst in terms of formula weights of catalyst forming iron salt desirably used in the isomerization is, in general, in the range from about 0.001–10 per 100 mols of olefin.

Preferably, the contacting is carried out in the liquid phase in the absence of a diluent, that is, neat. Isomerization can be effected in the presence of a diluent, providing that it is relatively inert, for example, inert liquid hydrocarbons, and the like, and at temperatures sufficiently elevated, such that the isomerization is rapidly accomplished.

In the preparation of the catalyst system of the present invention, anhydrous ferrous and ferric salts, such as iron acetate, benzoate, bromide, carbonate, chloride, citrate, fluoride, formate, iodide, lactate, malate, nitrate, oleate, oxalate, acetylacetonate, phosphate, metasilicate, naphthenate, and the like, are dissolved or dispersed in finely divided form in situ in the olefinic hydrocarbon to be isomerized or in an inert hydrocarbon diluent such as hexane. In general, a rapid and substantially instantaneous reducing interaction occurs upon mixing between the iron salts and the organometallic compounds, thereby resulting in the production of the active isomerization catalyst. Catalyst preparation can also be carried out by the mixing of the catalyst components per se. The mixing is best accomplished in situ at ambient temperatures under an inert nitrogen atmosphere, but may also be accomplished at isomerizing reaction temperatures.

During catalyst preparation, care must be taken to exclude substances which interact chemically with organometallic compounds to the detriment of the desired olefin isomerization catalyst forming reaction. After the catalyst has been prepared by the interaction of the iron salt with the organometallic compound, much less care need be taken as the prepared catalyst is relatively insensitive to the foregoing materials and is non-pyrophoric.

Any iron salt reducing organometallic compound can be used for the preparation of olefin isomerization catalysts. Preferably, the organometallic compound is a Mendelyeev Group I, II, or III compound. Most desirably, the organometallic compound is a trihydrocarbyl aluminum in which the hydrocarbyl radical components are stable radicals having from 1–20 carbon atoms per group, including phenyl, naphthyl, benzyl, alkyl, alkenyl, cycloalkyl, cycloalkenyl, methyl, cyclohexyl, butyl, hexadecyl, and $C_{20}H_{41}$, and the like. Thus, any organometallic compound having a reducing action upon the iron salt and resulting in a complex reduced iron species is a satisfactory organometallic compound for use in the present process.

Representative preferred organometallic compounds are triphenyl, trimethyl, triethyl, diphenylmethyl, triisobutyl, tricyclohexyl, tridodecyl aluminum, and the like. Replacement of one or two of the hydrocarbyl radicals by the substantially equivalent hydride radicals also yields satisfactory isomerization catalysts useful in the process.

The iron salts themselves have no appreciable isomerization activity when contacted with olefinic hydrocarbon feed in accordance with the present process. When from 0.5–6 mols of an organometallic compound are contacted with one formula weight ratio of a reducible iron salt, useful olefin isomerization catalysts result. The use of lesser relative amounts of the organometallic compound per unit of the iron salt results in some catalytic activity, but the utilization of the iron salt is inefficient. The use of larger relative amounts of the organometallic compound than in the ratio of about 6.0 mols to one formula weight of the iron salt is not practicable, because the excess addition over about a 4.5:1 ratio appears to produce little additional catalytic isomerization activity and may result in a reduction in relative isomerizaton activity.

Preferred ratios are in the range of 2.5–4.5 mols of organometallic promoter compound per formula weight of the iron salt. The higher ratios are preferred in the case of the ferric salts.

Preferred iron salts for use in isomerization catalyst formation are those stable anhydrous iron salts of acidic organic compounds comprising carbon, hydrogen, and oxygen having from 1 to 35 carbon atoms and pKa values in the range from 1–20, as measured in an ether medium at 25° C. More preferable are iron salts of monobasic acidic organic compounds having from 6 to 35 carbon atoms and pKa values in the range 1–20 of the general formula:

$$RYOH$$

in which R is hydrogen or a stable hydrocarbyl radical having from 5 to 34 carbon atoms per group, and Y is a bivalent radical such as —CO—, —CH$_2$—, —COCH$_2$—, —CH=CH—, —C$_6$H$_4$— (phenylene, o, m and p) and —C$_{10}$H$_6$— (naphthylene, all). Catalysts prepared from iron salts of the monobasic acidic organic compounds having from 6–35 carbon atoms per acid group in general result in isomerization catalysts in the form of highly dispersed sols having little or no agglomeration tendencies and especially high unit isomerization efficiency as compared to lower molecular weight carboxylic acid salts. Salts corresponding to the above organic acids which are inertly substituted inorganic acids may also be employed. By inertly substituted is meant replacement of one or more hydrogen atoms of the organic acid by substituent groups known to be unreactive toward organometallic compounds.

Representative of the more preferable iron salts of monobasic acidic organic compounds are the salts of 2-ethylhexanoic, benzoic, toluic (o, p and m), phenolic, undecylenic, naphthenic, cyclohexanecarboxylic, n-hexadecanoic, 3-cyclohexene carboxylic, octanoic, and the like acids, that is, where R may be a stable (inert towards organometallic compounds) hydrocarbyl radical including phenyl, naphthyl, benzyl, alkyl, alkenyl, cycloalkyl, cycloalkenyl, cyclohexyl, pentyl, hexadecyl, and the like.

Isomerizable olefinic hydrocarbons as known in the carbon-carbon double bond isomerization art in general are isomerized when brought into contact with the promoted iron salt catalysts of the process, preferably in the liquid phase at a temperature in the range from about 25° C. to 200° C., and are all contemplated as process feeds including liquifiable polyethylene olefinic polymers.

Representative olefinic hydrocarbon feed compound types include mono-, di- and polyolefinic alkenes, cycloalkenes, alkenylcycloalkenes, alkylcycloalkenes, as well as the mono- and polynuclear aromatic hydrocarbon radical substituted derivatives thereof. Branched and unbranched chain feed variations are contemplated as well as mixtures. Exemplary compounds are 1-hexene, 2-hexene, 1,7-octadiene, 1,6,9-decatriene, 3-methylcyclohexene, 4-vinylcyclohexene, 3-phenyl-1-hexene, β-allylnaphthalene, 4-methyl-1-pentene, 1,5-cyclooctadiene, 1,5,9-cyclododecatriene, methylcyclopentenes, 4-octene,1-octene, cyclohexadiene, and the like.

Other type compounds and examples include the terpenes, naphthenes, pinenes, bornylene, camphene, santalene, cadinene, zingiberene, bisaboline, menthene, limonine, thujene, sabinene, and the like. As a practical matter all isomerizable olefinic hydrocarbon feed compounds and their mixtures having less than about 50 and greater than 3 carbon atoms per molecule are particularly contemplated for process feed compounds.

In addition to the above hydrocarbon feeds, their inertly substituted derivatives are also contemplated as feeds to the process. By inert substituents is meant those known substituent groups which are unreactive towards finely divided reduced iron complexes.

The examples following are given for purposes of illustration, and it is to be understood that the invention is not to be limited to these specific conditions or details set forth, but only insofar as such limitations are specified in the appended claims.

*Example I.—In situ catalyst preparation*

Anhydrous iron 2-ethylhexanoate (0.005 mol) was dissolved in 1,5-cyclooctadiene (COD) (0.5 mol) and triethyl aluminum (0.015 mol) was added while maintaining during mixing a substantially oxygen-free inert nitrogen atmosphere above the solution. The mixing temperature was room temperature i.e. about 22° C. An immediate reaction took place as shown by the transformation of the colorless reaction medium into a black opaque system in which the extremely finely divided black reaction product was in the form of a stable sol. Strong heating and contact with the atmosphere did not appear to materially affect the nature of the sol.

*Example.—Olefin isomerizations*

The isomerizable feed, 1,5-cyclooctadiene, containing the isomerization catalyst prepared in situ as in Example I, was heated at 125° C. for about 8.5 hours' reaction time. Representative aliquot samples were withdrawn from the reaction mixture and analyzed by means of gas-liquid phase chromatographic techniques and appropriate standards. The following data were obtained:

| Time, Hrs. | Composition, percent | | |
|---|---|---|---|
| | 1,3-COD | 1,4-COD | 1,5-COD |
| 0 | 0 | 0 | 100 |
| 0.3 | 54.5 | 19.5 | 27 |
| 1.5 | 71 | 13 | 16 |
| 3.5 | 81 | 9 | 10 |
| 6.5 | 86 | 7 | 7 |
| 8.5 | 87 | 6.5 | 6.5 |

The recovery of cyclooctadiene was essentially quantitative.

*Example III*

A catalyst was prepared as in Example I, except that ferric formate was used in place of the 2-ethylhexanoate salt, with the relative amount being:

1,5-cyclooctadiene, mols _____ 0.20
Iron formate, formula wts. _____ .002
Triethyl aluminum _____ .008 and after a 5 hour reaction period under the conditions of Example II, the composition was: 1,3-COD 16.5%; 1,4-COD 27.8%; 1,5-COD 55.7%.

*Example IV*

Using substantially the same relative amounts of feed and catalyst, Example II was repeated except that the isomerization temperature was 27° C. After 5 hours at temperature, the cyclooctadiene composition was found to be: 1,3-COD 3.1%; 1,4-COD 9.4%; 1,5-COD 87.5%.

From the above examples, it is to be seen that cycloolefinic hydrocarbons are readily isomerized in the presence of the promoted iron salt catalysts of the present invention. With increasing temperature, isomerization rates are correspondingly larger. Thus, in the range 150–200° C., substantially equilibrium corresponding olefin mixtures are obtained after contact times of minutes and less with catalytic amounts of the isomerization catalyst. Unconjugated polyolefins are seen to be readily converted to conjugated isomers with little or no loss to undesirable by-products.

*Example V*

In the manner of Example I, an isomerization catalyst was prepared in situ in 1-hexene (0.20 mol) using triethyl aluminum (0.006 mol) and iron 2-ethylhexanoate (0.001 formula weight). The resulting reaction system was maintained at 69° C. over a four-hour period. The hexene composition was:

Hexene— Percent
  1- _____ 1.8
  Trans-3- _____ 4.6
  Cis-3-, trans-2- _____ 72.1
  Cis-2- _____ 21.5

*Example VI*

4-vinylcyclohexene (0.5 mol) was isomerized using a catalyst prepared as in Example 1 (0.005 mol iron 2-ethylhexanoate, 0.015 mol triethyl aluminum), by maintaining the system at 110° C. for 18 hours. From the chromatograph nine olefin isomers appeared to be present in the product in the percentages and order: 0.4, 1.3, 11.5, 12.4, 1.5, 1.2, 8.7, 46.3, and 16.5. At least 62.8 percent of the product, the last two isomers, is believed to be conjugated diene. Little or no losses occurred as a result of by-product formation.

*Example VII*

1-hexadecene (1.0 mol) was heated for 4 hours at 125–135° C. with a catalyst prepared from 0.005 mols of iron 2-ethylhexanoate and 0.027 mol $Et_3Al$. Distillation gave a near quantitative yield of a liquid, B.P. 107–113/0.4 mm. Hg, whose infrared spectrum indicated strong absorbtion at 965 cm.$^{-1}$ (trans-internal) and extremely weak absorbtion at 910 to 990 cm.$^{-1}$ characteristic of 1-olefins. The NMR spectrum indicated 97% internal olefin based on a signal at $\delta=5.2$ p.p.m. (from tetramethylsilane) and only 3% 1-olefin based on signal at $\delta=4.9$.

*Example VIII*

A similar experiment as in VII and in which 243 grams of a $C_{15}$–$C_{20}$ α-olefin fraction derived from the cracking of petroleum wax was used, yielded upon distillation (B.P. 91–150°/0.4 mm.) an oil whose infrared spectrum indicated largely trans-internal olefin.

From the foregoing examples it is to be seen that as in the case of unconjugated cyclodienic hydrocarbons, acyclic olefinic and cycloolefinic double bonds are isomerizable in the process and yield substantially equilibrium mixtures. For example, the equilibrium n-hexene mixture (calculated thermodynamic equilibrium values for 69° C.) contains about 1% 1-hexene, and 20% cis-2-hexene as well as the other isomers. In Example 5, there was found 1.8% 1-hexene and 21.5% cis-2-hexene. Moreover, hydrocarbons comprising combined side-chain and ring unconjugated olefin functional groups as in 4-vinylcyclohexene are readily isomerized to a product mixture which is predominantly conjugated diene. Such dienes wherein one double bond is in the ring and one in the side chain are especially desirable in chemical synthesis using the Diels-Alder reaction for the production of fused ring compounds.

While the contacting of olefin feed and catalyst has been described as a liquid phase operation, it may also be accomplished wherein a vaporized olefin feed is contacted with the solid catalyst per se or as disposed upon an inert support.

I claim:

1. Process of isomerizing olefins by shifting carbon-carbon double bonds, which comprises contacting for a period of from about 0.001 to 50 hours and at a temperature in the range from about 0° to 300° C. an isomerizable olefinic hydrocarbon in the liquid phase with a catalytic amount of an isomerization catalyst consisting essentially of the interaction product of:
   (a) one formula weight of an anhydrous reducible iron salt, and
   (b) from about 0.5 to 6 mols of an iron salt reducing organometallic compound selected from Mendelyeev Groups I, II or III compounds.

2. The process of claim 1, in which said organometallic compound is a stable trihydrocarbyl aluminum, the hydrocarbyl radical components of which have from 1 to 20 carbon atoms per radical group.

3. Process of isomerizing olefins by shifting carbon-carbon double bonds, which comprises contacting for a period of from about 0.001 to 50 hours and at a temperature in the range from about 0° to 300° C. an isomerizable olefinic hydrocarbon in the liquid phase with a catalytic amount of an isomerization catalyst consisting essentially of the interaction product of:
   (a) one formula weight of a stable anhydrous iron salt of an acidic organic compound comprising carbon, hydrogen and oxygen having from 1 to 35 carbon atoms and a pKa value in the range 1–20, and
   (b) from about 0.5 to 6 mols of an iron salt reducing organometallic compound selected from Mendelyeev Groups I, II or III compounds.

4. Process of isomerizing olefins by shifting carbon-carbon double bonds, which comprises contacting for a period of from about 0.001 to 50 hours and at a temperature in the range from about 0° to 300° C. an isomerizable olefinic hydrocarbon in the liquid phase with a catalytic amount of an isomerization catalyst consisting essentially of the interaction product of:
   (a) one formula weight of a stable anhydrous iron salt of an acidic monobasic organic compound comprising carbon, hydrogen, and oxygen having from 6 to 35 carbon atoms, having a pKa in the range from 1 to 20 and of the general formula:

$$RYOH$$

in which R is selected from the group consisting of hydrogen and stable hydrocarbyl radicals having from 5 to 34 carbon atoms per group, and Y is a bivalent radical selected from the group consisting of —CO—, —CH$_2$—, —COCH$_2$—, —CH=CH—, —C$_6$H$_4$—, and —C$_{10}$H$_6$—, and
   (b) from about 0.5 to 6 mols of an iron salt reducing organometallic compound selected from Mendelyeev Groups I, II or III compounds.

5. The process of claim 4, wherein said organometallic compound is a trihydrocarbyl aluminum having from 1 to 20 carbon atoms per hydrocarbyl radical group.

6. The process of claim 5, wherein 2.5 to 4.5 mols of said organometallic compound is used.

References Cited by the Examiner
UNITED STATES PATENTS

| | | | |
|---|---|---|---|
| 2,978,523 | 4/1961 | Coyne et al. | 260—683.2 |
| 3,004,087 | 10/1961 | Goddard et al. | 260—683.15 |
| 3,193,596 | 7/1965 | Bown et al. | 260—683.2 |

DELBERT E. GANTZ, *Primary Examiner.*

PAUL M. COUGHLAN, *Examiner.*

R. H. SHUBERT, *Assistant Examiner.*